(12) United States Patent
Zachmann

(10) Patent No.: US 9,202,190 B2
(45) Date of Patent: Dec. 1, 2015

(54) METHOD FOR TRACKING AND CONTROLLING GRAINY AND FLUID BULK GOODS IN STREAM-ORIENTED TRANSPORTATION PROCESS USING RFID DEVICES

(75) Inventor: Guenter Zachmann, Rauenberg (DE)

(73) Assignee: SAP SE, Walldorf (DE)

( * ) Notice: Subject to any disclaimer, the term of this patent is extended or adjusted under 35 U.S.C. 154(b) by 1249 days.

(21) Appl. No.: 11/754,913

(22) Filed: May 29, 2007

(65) Prior Publication Data
US 2008/0300712 A1    Dec. 4, 2008

(51) Int. Cl.
*G06Q 10/00* (2012.01)
*G06Q 20/00* (2012.01)
*G06Q 10/08* (2012.01)

(52) U.S. Cl.
CPC ...................... *G06Q 10/08* (2013.01)

(58) Field of Classification Search
CPC ... G06Q 10/087; G06Q 20/203; G06Q 10/08; G06Q 10/0875; G06Q 10/06; G06Q 20/208; G06Q 20/20; G06Q 30/06
USPC ...................................... 705/28, 23
See application file for complete search history.

(56) References Cited

U.S. PATENT DOCUMENTS

| | | | | |
|---|---|---|---|---|
| 4,829,250 A * | 5/1989 | Rotier | ........................... | 324/225 |
| 4,920,488 A * | 4/1990 | Filley | ............................. | 705/28 |
| 5,422,816 A * | 6/1995 | Sprague et al. | ............. | 455/556.2 |
| 5,455,409 A * | 10/1995 | Smith et al. | .................... | 235/385 |
| 5,691,921 A * | 11/1997 | Berlin | ............................. | 702/99 |
| 5,809,479 A * | 9/1998 | Martin et al. | ................ | 705/7.24 |
| 5,891,371 A * | 4/1999 | Lepper et al. | .................. | 264/2.1 |
| 6,029,140 A * | 2/2000 | Martin et al. | ................ | 705/7.24 |
| 6,058,374 A * | 5/2000 | Guthrie et al. | .................. | 705/28 |
| 6,097,995 A * | 8/2000 | Tipton et al. | .................. | 700/266 |
| 6,130,964 A * | 10/2000 | Marques et al. | ............. | 382/236 |
| 6,441,778 B1 * | 8/2002 | Durst et al. | ............. | 342/357.55 |
| 6,446,049 B1 * | 9/2002 | Janning et al. | .................. | 705/40 |
| 6,449,611 B1 * | 9/2002 | Frankel et al. | ......................... | 1/1 |
| 6,480,147 B2 * | 11/2002 | Durst et al. | ............. | 342/357.55 |
| 6,611,686 B1 * | 8/2003 | Smith et al. | .................... | 340/990 |
| 6,796,504 B2 * | 9/2004 | Robinson | ................ | 235/462.13 |
| 6,804,606 B2 * | 10/2004 | Jones | ........................... | 701/465 |
| 6,847,305 B1 * | 1/2005 | Buck | ........................ | 340/870.07 |
| 6,859,722 B2 * | 2/2005 | Jones | ........................... | 701/465 |
| 7,019,640 B2 * | 3/2006 | Canich et al. | ................. | 340/531 |
| 7,031,838 B1 * | 4/2006 | Young et al. | ....................... | 702/2 |
| 7,066,256 B2 * | 6/2006 | Dillenbeck et al. | ........ | 166/255.1 |

(Continued)

OTHER PUBLICATIONS

Going Beyond auto-Id by patrick Spieb, Journal of Enterprise Info mgmt 20.3 (2007): pp. 356-370.*

(Continued)

*Primary Examiner* — Matthew Gart
*Assistant Examiner* — Harshad Parikh
(74) *Attorney, Agent, or Firm* — Dilworth IP LLC

(57) ABSTRACT

A method and system for tracking non-discrete goods. The method includes inserting a first identification device into a non-discrete good, detecting the first identification device within the non-discrete good, and determining a characteristic of the non-discrete good from the first identification device. The system includes a plurality of identification devices having characteristics similar to a non-discrete good, and a set of sensors to detect the plurality of identification devices and determine a characteristic of the non-discrete good based on the identification devices.

25 Claims, 12 Drawing Sheets

(56) References Cited

U.S. PATENT DOCUMENTS

| | | | |
|---|---|---|---|
| 7,162,328 B2* | 1/2007 | Hornbaker et al. | 700/213 |
| 7,205,897 B2* | 4/2007 | Lin | 340/572.1 |
| 7,254,468 B2* | 8/2007 | Pillar et al. | 701/22 |
| 7,283,630 B1* | 10/2007 | Doljack | 380/55 |
| 7,313,471 B2* | 12/2007 | Roberts | 701/29.4 |
| 7,389,815 B2* | 6/2008 | Badalamenti et al. | 166/253.1 |
| 8,612,317 B1* | 12/2013 | Harman et al. | 705/30 |
| 2002/0103728 A1* | 8/2002 | Naghshineh et al. | 705/29 |
| 2004/0066328 A1* | 4/2004 | Galley et al. | 342/357.1 |
| 2004/0113783 A1* | 6/2004 | Yagesh | 340/568.1 |
| 2004/0197920 A1* | 10/2004 | Swenson et al. | 436/5 |
| 2004/0215532 A1* | 10/2004 | Boman et al. | 705/28 |
| 2004/0236620 A1* | 11/2004 | Chauhan et al. | 705/9 |
| 2005/0000458 A1* | 1/2005 | Pratt | 119/51.02 |
| 2005/0015392 A1* | 1/2005 | Tonkin | 707/100 |
| 2005/0049920 A1* | 3/2005 | Day et al. | 705/15 |
| 2005/0096991 A1* | 5/2005 | Main et al. | 705/22 |
| 2005/0114007 A1* | 5/2005 | Pillar et al. | 701/82 |
| 2005/0121467 A1* | 6/2005 | Crisp et al. | 222/129.1 |
| 2005/0149378 A1* | 7/2005 | Cyr et al. | 705/10 |
| 2005/0173464 A1* | 8/2005 | Crisp, III | 222/399 |
| 2005/0177454 A1* | 8/2005 | Crisp, III | 705/26 |
| 2005/0177481 A1* | 8/2005 | Crisp, III | 705/34 |
| 2006/0015374 A1* | 1/2006 | Ochs et al. | 705/4 |
| 2006/0053075 A1* | 3/2006 | Roth et al. | 705/50 |
| 2006/0054682 A1* | 3/2006 | de la Huerga | 235/375 |
| 2006/0058913 A1* | 3/2006 | Andersen et al. | 700/214 |
| 2006/0059353 A1* | 3/2006 | Mihcak et al. | 713/176 |
| 2006/0069919 A1* | 3/2006 | Mihcak et al. | 713/176 |
| 2006/0074813 A1* | 4/2006 | Saunders | 705/67 |
| 2006/0077036 A1* | 4/2006 | Roemerman et al. | 340/5.61 |
| 2006/0161787 A1* | 7/2006 | Kikuchi | 713/186 |
| 2006/0208885 A1* | 9/2006 | Lin | 340/572.1 |
| 2006/0212195 A1* | 9/2006 | Veith et al. | 701/35 |
| 2006/0244588 A1* | 11/2006 | Hannah et al. | 340/539.13 |
| 2006/0259397 A1* | 11/2006 | Schluetter | 705/37 |
| 2006/0265294 A1* | 11/2006 | de Sylva | 705/28 |
| 2006/0282340 A1* | 12/2006 | Morand et al. | 705/28 |
| 2007/0011023 A1* | 1/2007 | Silverbrook | 705/1 |
| 2007/0029382 A1* | 2/2007 | Baker et al. | 235/385 |
| 2007/0050261 A1* | 3/2007 | Lin | 705/22 |
| 2007/0061210 A1* | 3/2007 | Chen et al. | 705/22 |
| 2007/0061274 A1* | 3/2007 | Gipps et al. | 705/400 |
| 2007/0100653 A1* | 5/2007 | Ramer et al. | 705/1 |
| 2007/0118399 A1* | 5/2007 | Avinash et al. | 705/2 |
| 2007/0156545 A1* | 7/2007 | Lin | 705/28 |
| 2007/0165904 A1* | 7/2007 | Nudd et al. | 382/100 |
| 2007/0174152 A1* | 7/2007 | Bjornberg et al. | 705/28 |
| 2007/0210921 A1* | 9/2007 | Volpi et al. | 340/572.1 |
| 2007/0220126 A1* | 9/2007 | Raghunathan et al. | 709/223 |
| 2007/0229229 A1* | 10/2007 | Nelson et al. | 340/10.41 |
| 2007/0229350 A1* | 10/2007 | Scalisi et al. | 342/350 |
| 2007/0288376 A1* | 12/2007 | Block | 705/44 |
| 2008/0235081 A1* | 9/2008 | Davison et al. | 705/10 |
| 2008/0300712 A1* | 12/2008 | Zachmann | 700/116 |
| 2009/0319400 A1* | 12/2009 | Pratt | 705/28 |
| 2010/0023162 A1* | 1/2010 | Gresak et al. | 700/241 |
| 2010/0109903 A1* | 5/2010 | Carrick | 340/825.49 |
| 2011/0238361 A1* | 9/2011 | Ueki | 702/127 |

OTHER PUBLICATIONS

Products, Anonymous, Machine design 79.8 (Apr. 26, 2007) pp. 110-112, 114-126.*

* cited by examiner

METHOD FOR TRACKING AND CONTROLLING GRAINY AND FLUID BULK GOODS IN STREAM-ORIENTED TRANSPORTATION PROCESS USING RFID DEVICES

BACKGROUND

1. Field of the Invention

The embodiments of the invention relate to the tracking of goods in a supply chain or transportation system. Specifically, the invention relates to the tracking of non-discrete goods using embedded sensors within a supply chain or transportation system.

2. Background

Supply chain management often utilizes tags and tracking devices to track the movement and location of discrete goods. Discrete goods are those goods that are packaged or have a form and size that allows for the placement of a tag or device on the good. For example, discrete goods include boxed items, such as toys, or loose items, such as a tire or clothing. A tag or device may be affixed to the box or loose item allowing the box or item to be tracked.

Tags and tracking devices include an identification number or alphanumeric sequence. A tag can have an identifier printed on it or encoded on it. For example, a bar code may be printed on the tag. A tracking device stores data such as identification information in a memory or the information is hardwired into the device. For example, a radio frequency identification (RFID) device includes an identification number. Some tags and tracking devices can also store additional information about the associated good including properties of the good, ownership, routing and location data. Alternatively, a database can store this information, which may be accessed by a lookup using the identifier from the tag or tracking device. This system can only be used for discrete goods because the tags and tracking devices must be printed on or affixed to a surface of a good. Non-discrete goods such as unpackaged grains, gases, liquids and similar substances do not have a surface of sufficient size to have a tag or tracking device printed on or affixed to them.

SUMMARY

Embodiments of the invention include a method and system for tracking non-discrete goods. The method includes inserting a first identification device into a non-discrete good, detecting the first identification device within the non-discrete good, and determining a characteristic of the non-discrete good from the first identification device. The system includes a plurality of identification devices having characteristics similar to a non-discrete good, and a set of sensors to detect the plurality of identification devices and determine a characteristic of the non-discrete good based on the identification devices.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
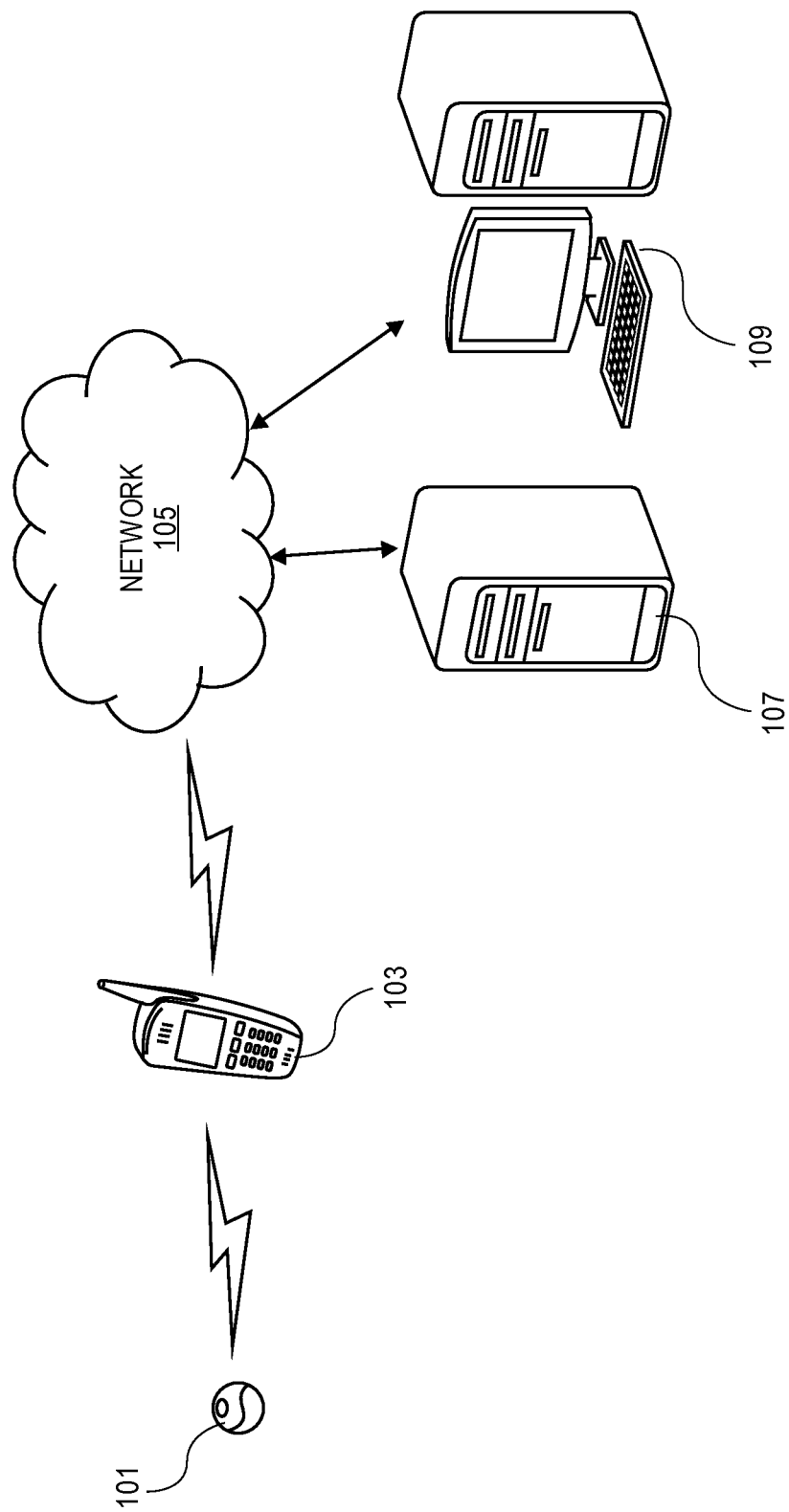
FIG. 1 is diagram of one embodiment of a system for tracking non-discrete goods.

FIG. 1 is diagram of one embodiment of a system for tracking non-discrete goods. In one embodiment, the system includes a tracking device 101 or similar identification device. The tracking device 101 is designed to be placed within a non-discrete good and to communicate with a read/write device 103 for the purposes of tracking the transportation of the non-discrete good that the tracking device 101 is to be inserted into. The tracking device 101 may be of any size or shape. In one embodiment, the tracking device 101 has properties similar to those of the non-discrete good into which it is to be inserted. The tracking device 101 has a similar size, weight or shape to the particles that make up the non-discrete good. For example, a tracking device 101 has a similar size and shape to a grain it is to track or has a density to match a liquid it is to be transported within.

The tracking device 101 communicates with a reader device 103 or similar device through any communication method, medium or protocol. In one embodiment, the tracking device 101 communicates wirelessly through radio frequency, infrared or similar wireless technology. In another embodiment, the tracking device 101 communicates electrically through direct contact or connection. The tracking device 101 may use any wireless or wired communication technology, including 801.11 b/g, Bluetooth, Ethernet, Firewire, universal serial bus (USB) or similar technology. In one example embodiment, the tracking device 101 is a radio frequency identification device (RFID device). For sake of clarity, many of the examples described herein utilize an RFID tracking device. However, one skilled in the art would understand that a tracking device and read/write device or similar sensor system using any communication mechanism can be substituted for the RFID tracking device and the described sensors.

In one embodiment, the tracking device 101 stores data. The tracking device 101 can be designed to carry any amount of data. The tracking device 101 may include memory circuits and components such as electronically erasable program only memories (EEPROM), flash memory, dynamic random access memory (DRAM), static random access memory (SRAM) and similar types of memory. The tracking device 101 communicates with the reader device 105 to provide information stored in the memory regarding the non-discrete good, the tracking device itself, and other tracked data. The data can include characteristics of the non-discrete good associated with the tracking device, such as quantity, type, origin, destination and similar information.

In one embodiment, the tracking device 101 includes a power source such as an internal battery, a mechanical potential (e.g., a wind up device or movement induced device) or similar source of power. In another embodiment, the tracking device 101 relies on external power provided wirelessly or through a wire or similar physical connection to an external device.

The system includes a read/write device 103. The read/write device 103 can be any fixed, portable or handheld device capable of receiving data from or transmitting data to a tracking device 103. The read/write device 103 includes a processor and memory to execute an application for collecting and managing data related to tracking non-discrete goods. The read/write device 103 is capable of communicating with other devices wirelessly or through a wired system. The read/write device 103 may communicate through 801.11 b/g, RF, infrared or similar communication technologies. The read/write device 103 can also communicate with a central server or other parts of the system through a network 105. In one embodiment, communication with the central server is through the use of the same mediums and protocols as the read/write device 103 uses for communicating with and retrieving data from the tracking device. In another embodiment, read/write device 103 uses a different medium and protocol for communication with the central server than was used by the read/write device 103 for communicating with and retrieving data from the tracking device 101.

In one embodiment, a network 105 is used for communication between the central server 107 and the read/write device 103. The network 105 is any type of network including a local area network, wide area network, the Internet or similar network. In another embodiment, any number of tracking devices or read/write devices each set up separate communication links to the central server 107. In a further embodiment, any number of servers are utilized to collect data and service queries for each read/write device or tracking device. Each server may manage or utilize different data or each may utilize the same data. For example, some servers handle data related to a particular tracking devices or type of data (e.g., shipping data, location data, characteristics data). The server 107 includes a set of processors and memory devices to execute applications that manage and collect tracking and non-discrete good data.

In one embodiment, the system includes a workstation 109, desktop, laptop or similar computer. The workstation computer 109 includes a set of software, processors and memory devices to execute an application that allows a user to access, view or manage tracking data and data related to the characteristics of the non-discrete goods. Any number of workstations can access, view or manage the data. The workstation 109 can access data stored at the server 107 or at the read/write device 103.

Figure 2A:
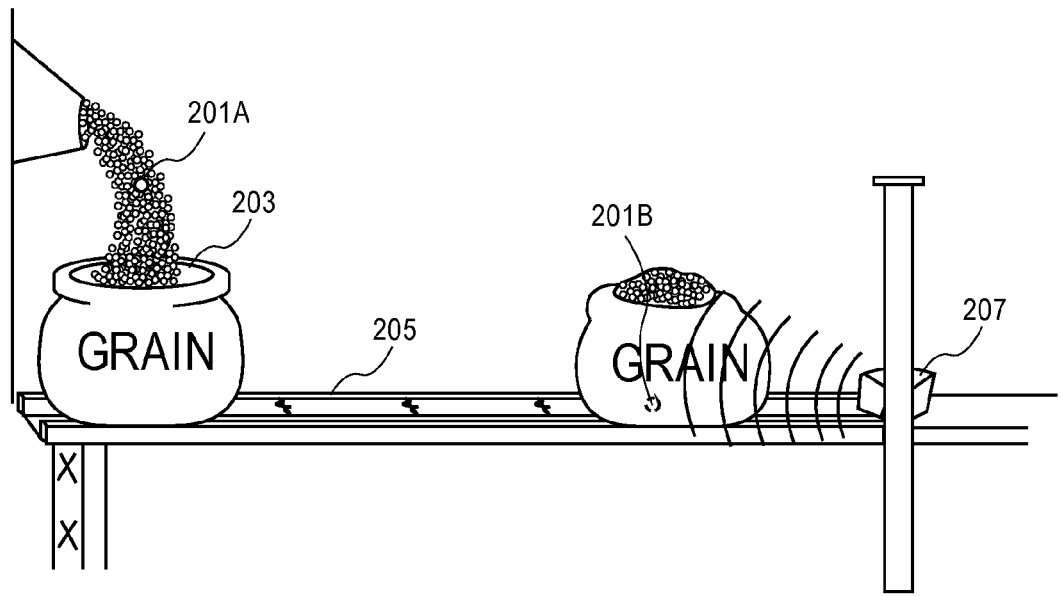
FIG. 2A is a diagram of one embodiment of the tracking system for tracking a non-discrete product as it is transported.

FIG. 2A is a diagram of one example embodiment of the tracking system tracking a non-discrete product as it is transported. In this example, a non-discrete good (e.g., grain) is being transported. The non-discrete good can be unpackaged, loosely packaged, moved between containers or similarly transported such that a tracking indicator or device that is typically adhered to or printed onto a good cannot be utilized. For example, grain 203 is poured into loose packaging such as bags and transported on a conveyor belt 205. In other embodiments the non-discrete good can be transported via piping, chutes or similar conveyances. The non-discrete good may similarly be transported without packaging, temporarily packaged or loosely packaged.

Tracking devices 201 are inserted into the non-discrete good at any stage of its transportation. The tracking device 201 is chosen that has properties such as size, weight, dimensions and similar properties to the non-discrete good. In one embodiment, the tracking device 201 is hard wired or pre-programmed to transmit an identifier. In another embodiment, the tracking device 201 is activated or programmed after insertion into the non-discrete good. The tracking device's identifier is tracked in a database that maintains data related to the shipment information and characteristics of the non-discrete good.

In one embodiment, a read/write device 207 is positioned along the path of the non-discrete good to detect tracking devices 201B. The read/write device 207 detects the tracking device 201B and stores data relating to the non-discrete good in its memory or sends data relating to the non-discrete good to a server. For example, the location of the non-discrete good, an estimated delivery time, a rate of movement or similar data related to the non-discrete good can be updated in the read/write device or server memory based on the detection and the receipt of information by the read/write device 207.

In one embodiment, the read/write device 207 also sends data to the tracking device 201B. The read/write device 207 sends identification information, location information, shipping information or similar information to the tracking device 201B to be stored within the tracking device 201B. The data is stored in a flash memory, electrically erasable programmable read only memory (EEPROM) or similar memory devices within the tracking device 201B. The data can be updated any number of times by any number of read/write devices.

Figure 2B:
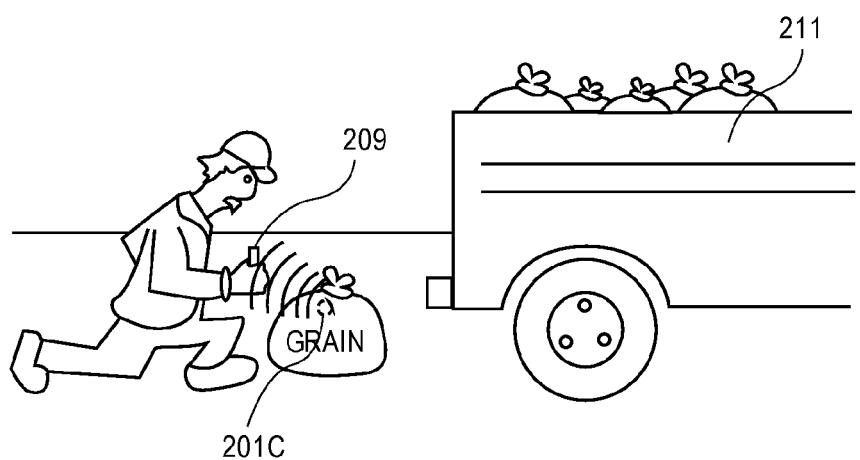
FIG. 2B is a diagram of one embodiment of the tracking system for identifying a non-discrete product when it arrives at a destination.

FIG. 2B is a diagram of one embodiment of the tracking system identifying a non-discrete product when it arrives at a destination. In the example embodiment, the non-discrete good 201C can be transported by any number of modes of transport. The non-discrete good 201C may remain unpackaged, be packed, repackaged or be similarly transported. A read/write device 209 is used to access data in the tracking device 201C or to determine the tracking device 201C identifier to update data related to the non-discrete good associated with the identifier. For example, the bagged grain 201C is transported to a destination location by truck 211. Personnel at the destination check the grain 201C with read/write devices 209. Data from the read/write devices 209 is sent to a central server where the receipt of the grain is recorded in inventory and similar supply chain management systems. An origin of the non-discrete good may be determined from accessing data from the tracking device and/or looking data up at the server. An origin may be confirmed by comparison between tracking devices in the non-discrete good. If any number of tracking devices have conflicting origins, then the origins of the goods may be questionable.

Figure 3:
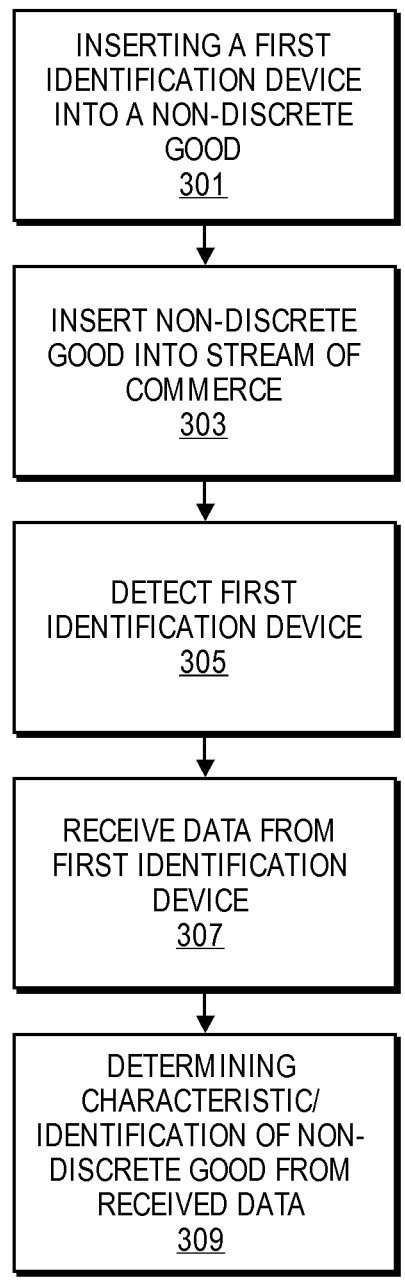
FIG. 3 is a flowchart of one embodiment of a process for tracking a non-discrete good.

FIG. 3 is a flowchart of one embodiment of a process for tracking a non-discrete good. In one embodiment, the process of tracking a non-discrete good is initiated by the insertion of a tracking device into the non-discrete good (block 301). Any number of tracking device can be inserted into the non-discrete good. Each of the tracking devices has a separate identifier or each tracking device shares an identifier or set of identifiers. As used herein, a set may refer to any positive whole number of items including one item. Identifiers can be shared amongst sets of similar or related items.

The tracking devices are placed in any portion of the non-discrete good and positioned at any location in the non-discrete good relative to other tracking devices. In one embodiment, tracking devices are spaced apart from one another at discrete distances to allow the detection of a rate of movement or to improve the likelihood that a device will be taken with any portion of the non-discrete good that is separated from the remainder of the non-discrete good or for similar reasons.

The tracking device is preprogrammed to include identifier information or is programmed during use to include identifier information. The tracking device can also be programmed or hardwired to include other information about the non-discrete good or its shipment such as information about the characteristics of the non-discrete good or its shipping route.

In one embodiment, after or before a set of tracking devices are inserted into a non-discrete good, the non-discrete good is inserted into the stream of commerce (block 303). The non-discrete good can be inserted into the stream of commerce by shipping or transporting the non-discrete good to a warehouse, retailer or similar location. The non-discrete good can be transported in any form or by any mode of transportation. The tracking device has properties, such as size, weight and density that match or conform to the properties of the non-discrete good so that it is transported with the non-discrete good in the same manner as the non-discrete good.

After the non-discrete good has entered the stream of commerce it is tracked by using a read/write device to detect the tracking devices (block 305). The read/write device accesses the data or identifier provided by the tracking device. The read/write device requests all or a portion of the data stored or wired into the tracking device through wireless communication protocol or wireline communication protocol or combinations thereof.

In one embodiment, data is received in response to the request from the read/write device (block 307). The data is received through any wireless or wireline protocol or technology. Any amount of data can be provided by the response. The data describes the identifier associated with the non-discrete good or any set of characteristics of or information regarding the non-discrete good. In another embodiment, the data is continuously accessible from tracking device.

The read/write device or the devices in communication with the read/write device can determine the identification or characteristic information for an item from amongst the received data (block 309). In one embodiment, the identifier or a whole of the characteristic data is retrieved by the read/write device. This data is then used to look up other similar or related data. For example, an identifier is used to lookup a particular non-discrete good property, shipping information or similar information that has been previously stored in a database and associated with the identifier. In another embodiment, only a subset of the available data is retrieved from the device specific to the request from the read/write device.

Figure 4:
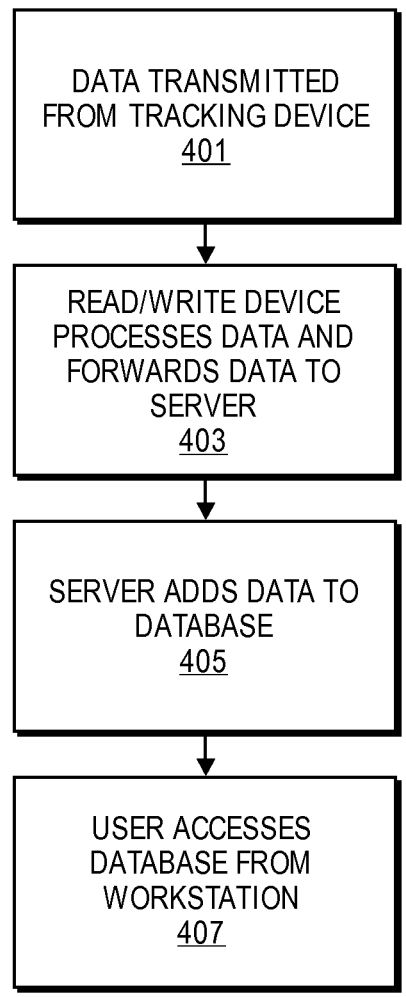
FIG. 4 is a flowchart of one embodiment of a non-discrete good identification process.

FIG. 4 is a flowchart of one embodiment of a non-discrete good identification process. In one embodiment, the process is initiated when a read/write device detects a tracking device transmitting data (block 401). Tracking devices may continuously transmit data or may intermittently transmit data that can be detected and received by a read/write device. In one embodiment, the read/write device stores the data received from the tracking device and processes the data to present it to the user. For example, the read/write device aggregates tracking data or compares new tracking data to previously received tracking data and generates a display of the aggregate or comparison info. In another embodiment, the data is collected and stored without display for a user. For example, the tracking data is received from the tracking device, stored in the read/write device, and then sent to a central server.

The read/write device forwards the collected data to a remote server (block 403). The read/write device continuously sends data to the server as it is received or intermittently transmits data to the server. If communication with the sever is not available, then the read/write device may store the data until communication with the server is reestablished. The read/write device sends the data to the server in the form that it was received or sends processed data to the server.

The server receives this data and adds it to a database (block 405). The database can be any type of data storage system including a set of flat files, a file system, a relational database or similar data management system. Data received from multiple read/write devices is aggregated or otherwise stored in the database system maintained by the server. Multiple servers and databases are maintained to backup the stored data or to divide the data to be processed by different applications or improve availability of the data.

Data maintained by the server is accessed and managed by workstations or similar machines in communication with the server (block 407). The server manages multiple workstations accessing the stored data to ensure data coherency and availability. The workstation user can alter or manipulate the data using any number of software applications, utilities, plug-ins or similar programs. For example, supply chain management software can access the data to track the movement of the non-discrete goods through the supply chain.

Figure 5:
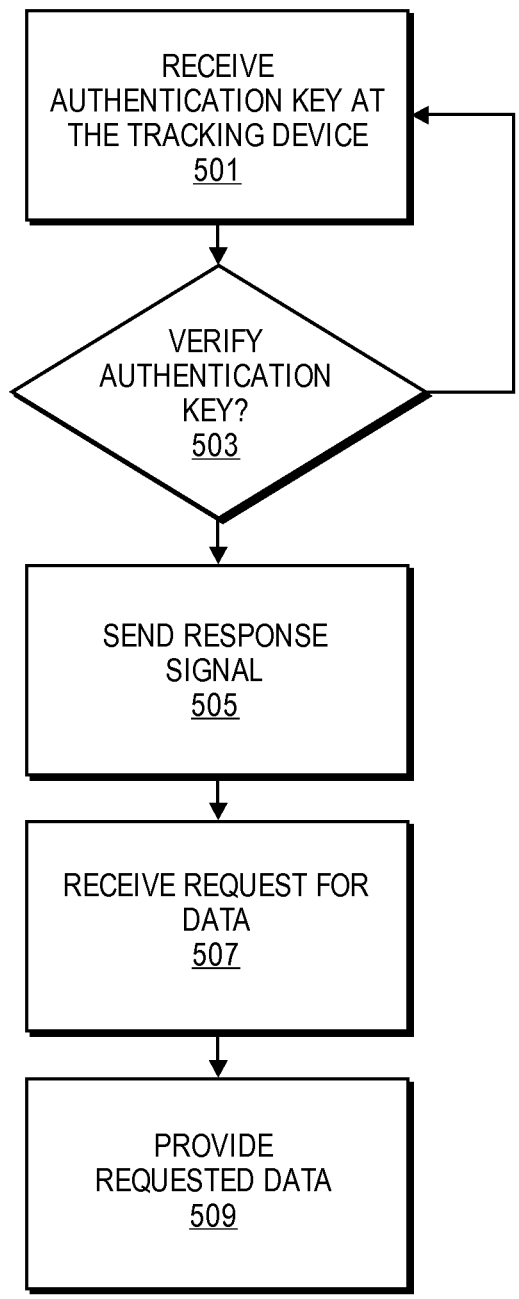
FIG. 5 is a flowchart of one embodiment of a process for secured tracking of a non-discrete good.

FIG. 5 is a flowchart of one embodiment of a process for secured tracking of a non-discrete good. In one embodiment, the tracking devices do not continuously transmit tracking data or are not accessible or detectable without authorization being received from a secure read-write device. The secure system is used to track the movement of non-discrete goods to prevent theft, unauthorized use, tampering or similar activities. This system or a similar system can also be used to conserve battery power for the tracking devices by diminishing the number of times that the tracking device must transmit data thereby reducing the amount of power consumed.

In one embodiment, the read/write device transmits an authentication key that may be received by a dormant tracking device (block 501). The authentication key may then be checked for authenticity by the tracking device (block 503). Any authentication system or technologies can be utilized to perform the authentication. Example authentications systems include unidirectional authentication of read/write devices at the tracking device using a reusable secret key, a single-use key out of a secret sequence of keys or a time-dependent key to prevent device from unauthorized detection. If the received authentication key is not verified, then the tracking device will remain dormant and await the reception of further authentication keys (block 501).

After the tracking device has left the dormant state, an additional bidirectional authentication using a proprietary or standardized method (e.g. Remote Authentication Dial In User Service (RADIUS) and its successor DIAMETER, in particular Diameter Mobile IPv4 Application (MobileIP, RFC 4004) can be used to prevent read/write devices from being confused by illegally or improperly injected tracking devices.

If the received authentication key is verified, then the tracking device sends an acknowledgement signal (block 505). Once an acknowledgement signal is received by the read/write device then the read/write device requests data from the tracking device. The tracking device authenticates the read/write device for different levels of access to data. The tracking device may refuse requests for data that the authentication does not allow for. For example, the tracking device may recognize multiple levels of user access, such as a user level and administrator level. A user level of access does not permit access to all of the data that an administrator level allows. Any number of different levels of access can be supported by the tracking device and read/write device. Alternatively, the tracking device can be activated and begin transmitting data once the key has been authenticated.

Upon receiving authentication the read/write device sends a request to the tracking device for data (block 507). In one embodiment, the tracking device provides data to the read/write device in response to the request (block 509). The tracking device provides only those data elements that are requested or may provide all data available or a defined subset of available data.

Figure 6:
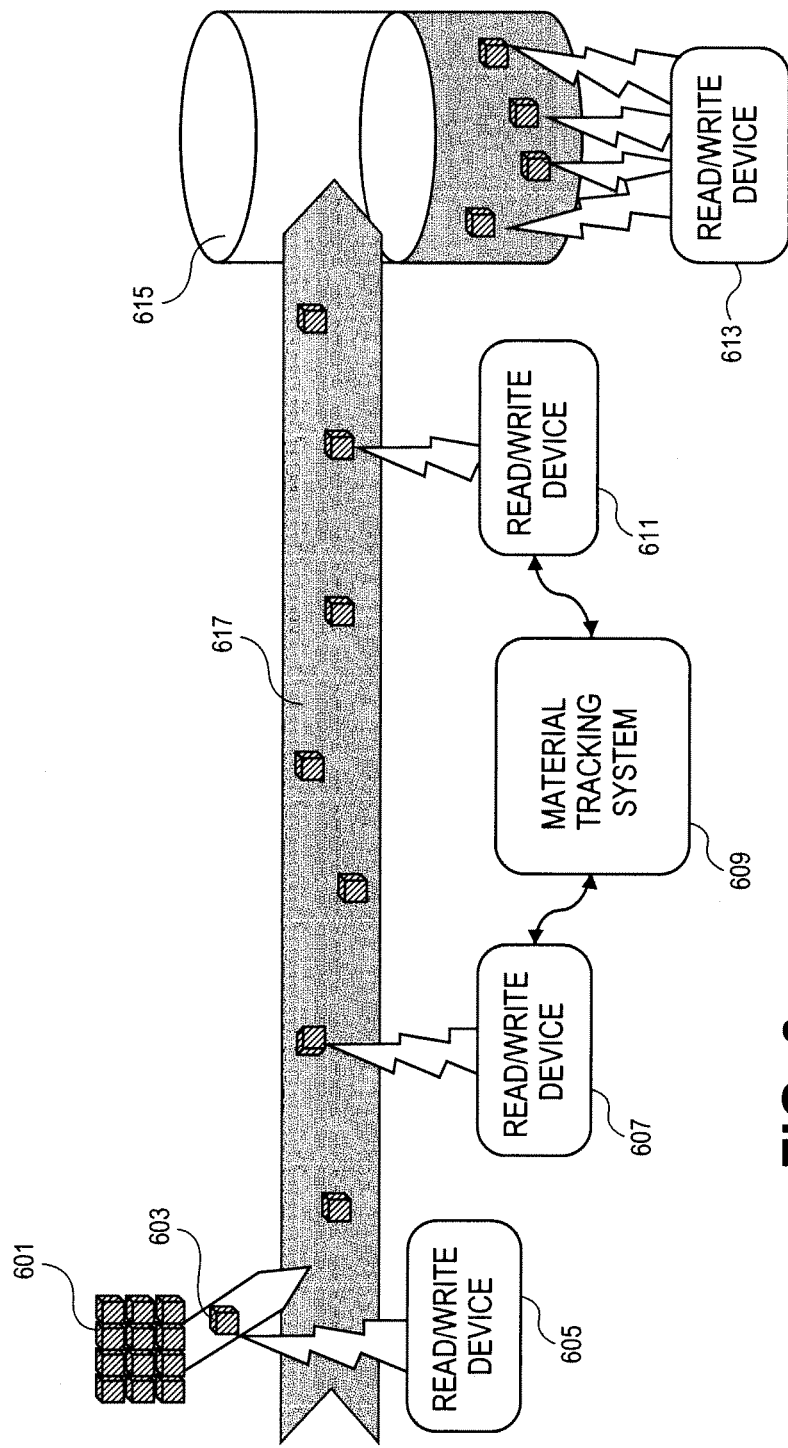
FIG. 6 is a diagram of one embodiment of a tracking system for non-discrete goods

FIG. 6 is a diagram of one example embodiment of a tracking system for non-discrete goods. In one embodiment, a pipeline, conveyor belt or similar transportation conduit moves a non-discrete good from a first location to a second location. To track the movement of the non-discrete good a set of tracking devices 601 is inserted into the conveyance. Tracking devices are inserted individually 603 at defined intervals of time, after defined movement of the non-discrete good or under similar conditions.

A read/write device 605 initializes the tracking devices 603 as they are inserted into the conveyance. The read/write device 605 writes time, location, an identifier and similar data to the tracking device. A second read/write device 607 subsequently checks each tracking device as it passes along the conveyance and sends the data from the tracking device to a material tracking system or similar central sever system. The data at the material tracking system is intermittently updated by additional read/write devices 611 along the route of the conveyance. The non-discrete good reaches a destination such as a storage container 615 or similar holding mechanism. A read/write device 613 near the destination logs each of the tracking devices as they reach the destination and sends updated tracking information to the material tracking system.

Figure 7:
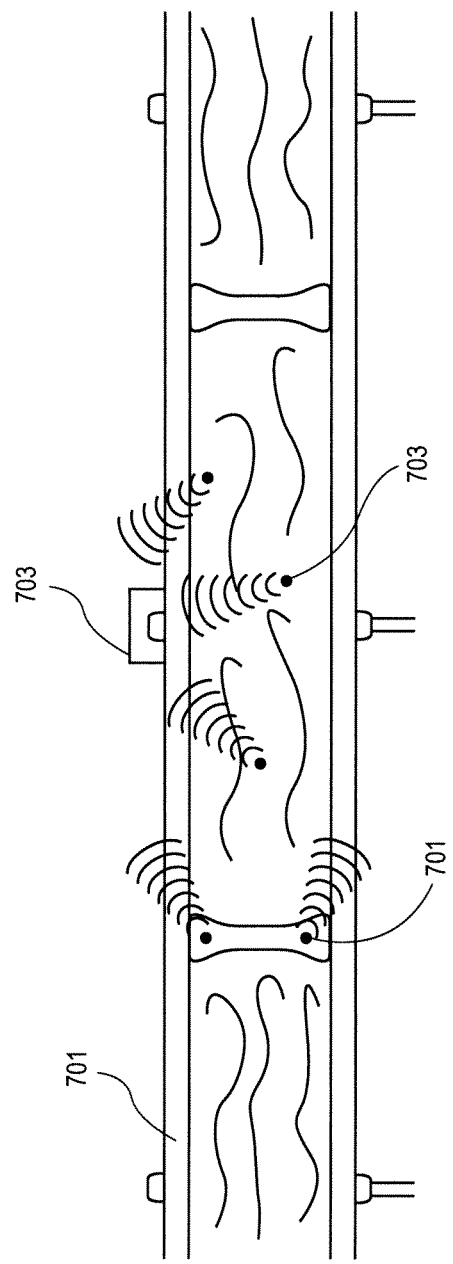
FIG. 7 is a diagram of one embodiment of a tracking system for non-discrete goods that marks the separation between goods.

FIG. 7 is a diagram of one embodiment of a tracking system for non-discrete goods that marks the separation between goods. In one embodiment, the tracking devices are used in a pipeline 701 or similar system. The pipeline is utilized to transport fluids, gases or similar substances. The tracking devices are embedded within separators that are utilized to separate and facilitate transport of different materials through a pipeline and prevent the mixture of the different materials. The tracking of the separators using the tracking devices allows for the tracking of the location of each material within the pipeline. The separators each pass read/write devices 703 along the pipeline that update a central system tracking the movement of goods through the pipeline.

In one embodiment, tracking devices are placed within the material in addition to the separators. The tracking devices within the material are used to detect the loss, tampering or alteration of the materials within the pipeline. If a tracking device within the material is lost it may indicate that a portion of the material has been lost. The amount of material lost is likely to be proportionate to the number of tracking devices lost.

Figure 8:
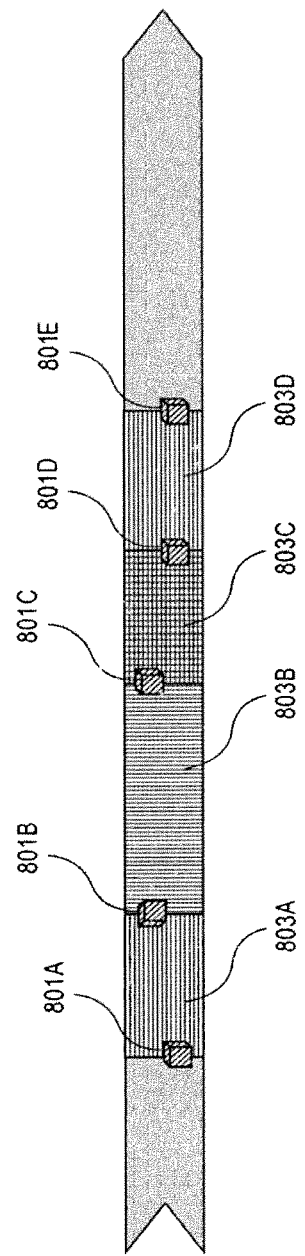
FIG. 8 is a diagram of another embodiment of a tracking system for non-discrete goods that marks the separation between goods or quantities.

FIG. 8 is a diagram of another embodiment of a tracking system for non-discrete goods that marks the separation between goods or quantities. In one embodiment, tracking devices 801A-801E are used to demarcate boundaries within a conveyance between different goods, quantities, units, owners or similar characteristics of the non-discrete goods being transported. Each tracking device 801A-801E is used to detect the start and end point for separate units or charges 803A-803D of goods. The tracking devices 801A-801E have physical properties that ensure that they move at the same speed relative to the adjoining charges to ensure that a relatively accurate marking of the boundary is maintained. This information can be used to package or route different charges to different locations or similarly differentiate the processing of the different charges.

Figure 9:
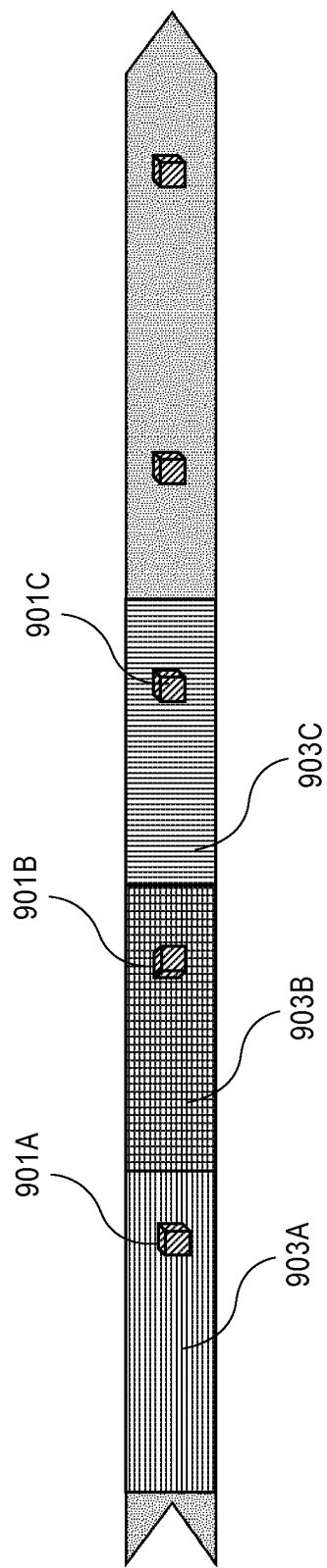
FIG. 9 is a diagram of one embodiment of a tracking system for non-discrete goods that tracks the density or proportion of a transported set of non-discrete goods.

FIG. 9 is a diagram of one embodiment of a tracking system for non-discrete goods that tracks the density or proportion of a transported set of non-discrete goods. In one example embodiment, tracking devices are used to indicate changing properties of the non-discrete goods being transported through a conveyance or conduit. In one example, two or more materials are mixed together in a pipeline. The relative proportion of the two materials changes. Tracking devices 901A-901C are used to mark the changes in the relative proportions or concentrations. In one example, a first tracking device 901A marks a portion of the non-discrete goods that is 100% a first good 903A. A second tracking device marks a portion of the non-discrete goods that is 50% a first good and 50% a second good 903B. A third tracking device 901C marks a portion of the non-discrete goods that is 100% the second good 903C.

Figure 10A:
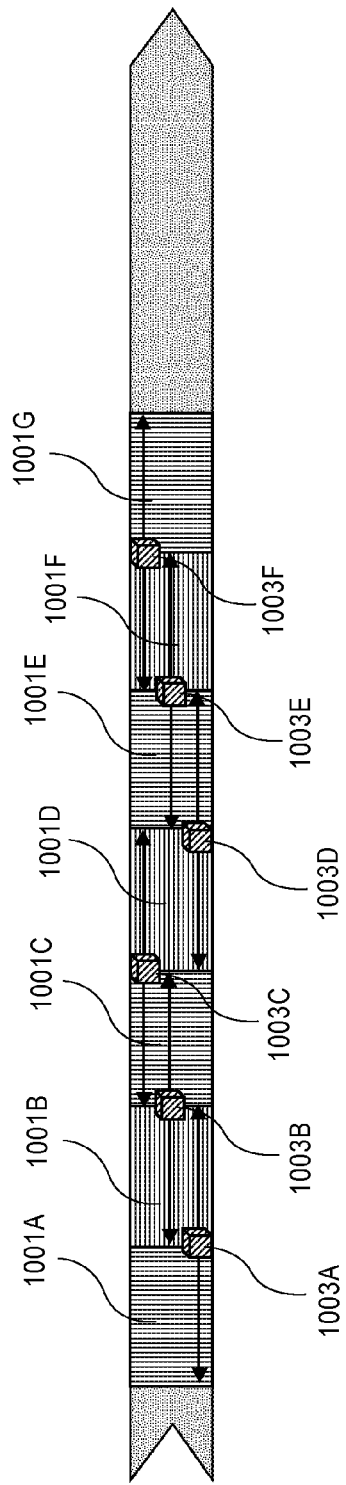
FIGS. 10A-C are diagrams of one embodiment of a system for tracking an amount of a non-discrete good being transported where the system is capable of detecting the addition or loss of a portion of the non-discrete good.
Figure 10B:
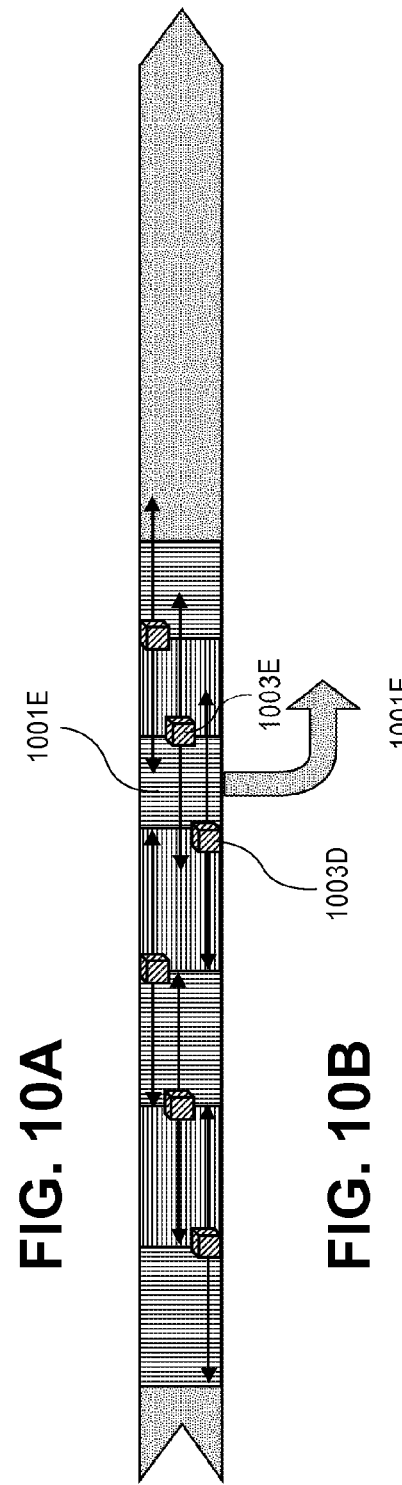
Figure 10C:
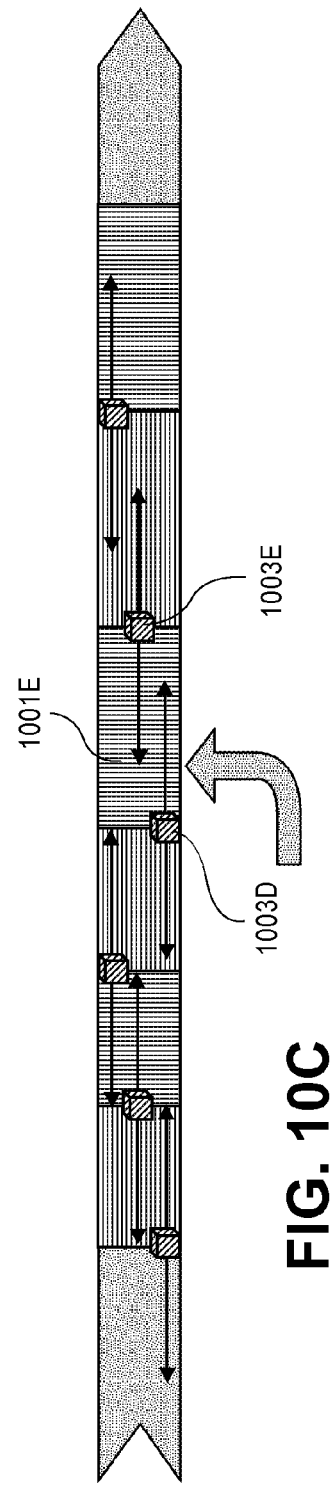

FIGS. 10A-C are diagrams of one embodiment of a system for tracking the amount a non-discrete good being transported that is capable of detecting the addition or loss of a portion of the non-discrete good. In FIG. 10A, quantities of non-discrete goods are tracked using tracking devices. Tracking devices 1003A-1003F are inserted into the conveyance or conduit for transporting the non-discrete goods at discrete intervals. Each tracking device stores data indicating the distance to the preceding or subsequent tracking device or the quantities of a non-discrete good 1001A-1001G between the tracking devices. In one embodiment, the tracking devices are programmed with this information at the time they are inserted into the non-discrete good. The information stored may be based on actual measurement or approximation of the distance between tracking devices or the amount of the good between the tracking devices. In another embodiment, the tracking devices are pre-programmed or hard-wired to indicate a distance or amount of good. The insertion is then timed to place the tracking devices in the appropriate position based on their stored data.

FIG. 10B is a diagram of an example of lost materials being detected by the system. A portion of the non-discrete good 1001E has been lost. As a result, tracking devices 1003D and 1003E are closer together than their internal data indicates. A comparison of the internal data of the tracking devices to their actual distance from one another is executed by a read/write device or server to detect the lost quantity of material. The timing and location of this loss may also be determined from the tracking data. For example, the previous reading by a read/write device is examined to determine that the spacing was correct and that as a result the leak or loss occurred between the current read/write device and the previous read/write device. The system also can maintain data about the read/write devices including their location and similar characteristics. This data can then be used to determine the location in conveyance or conduit of a leak or similar problem.

FIG. 10C is a diagram of an example of added materials being detected by the system. A portion of the non-discrete good 1001E has been augmented. As a result, tracking devices 1003D and 1003E are further apart than their internal data indicates. A comparison of the internal data of the tracking devices to their actual distance from one another is executed by a read/write device or server to detect the added quantity of material. The timing and location of this loss is also determined from the tracking data and similar data about the system such as read/write device placements, conduit conditions and similar information.

Figure 11:
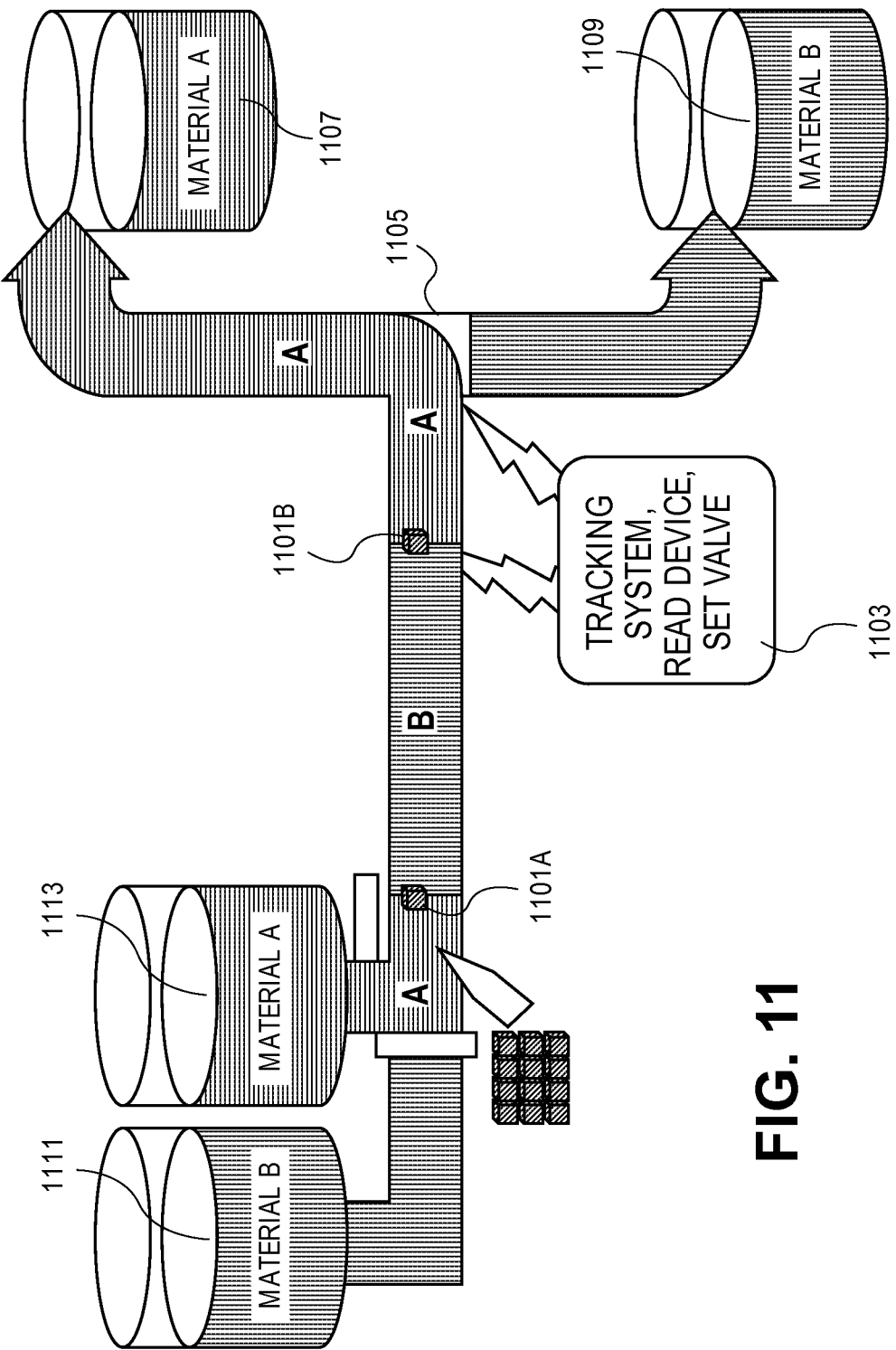
FIG. 11 is a diagram of one embodiment of a system for routing non-discrete goods using the tracking system.

FIG. 11 is a diagram of one embodiment of a system of routing non-discrete goods using the tracking system. In one embodiment, the tracking system is used to route non-discrete goods through a transport mechanism. In the example, a first material A 1111 and second material B 1113 are transported through a shared pipeline system. Tracking devices 1101A are inserted into the pipeline system to mark the separation of the two materials.

A read/write device 1103, detects the tracking device 1103 indicating a transition from the transportation of one material A 1111 to another material B 1113. The tracking system utilizes this data to manage the routing of materials or to supply routing data to a routing mechanism. For example, the detection of transitions between materials may be used to control a valve 1105 in the pipeline that manages the direction of materials through the pipeline. In this way, the valve can be adjusted to direct material A 1111 to a first storage container 1107, while the material B 1113 is directed to a second storage container 1109.

Figure 12:
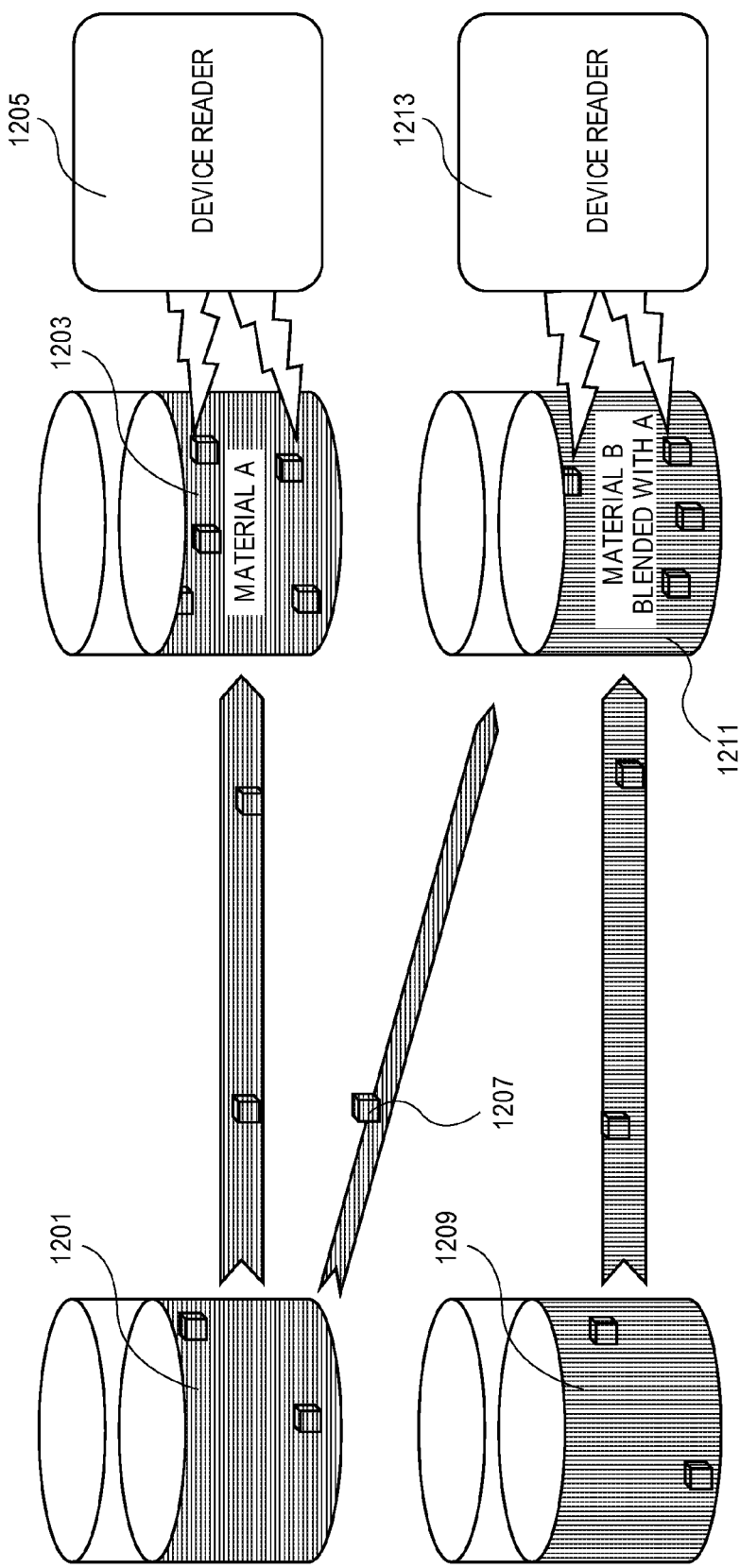
FIG. 12 is a diagram of one embodiment of a system for detecting improperly mixed non-discrete goods.

FIG. 12 is a diagram of one embodiment of a system for detecting improperly mixed non-discrete goods. In one example embodiment, materials with shared conveyance systems are monitored using the tracking system to detect improper routing or mixing of non-discrete goods. For example, a first material is routed from a first storage location 1201 to a second storage location 1203. A second material is routed from a third storage location 1209 to a fourth storage location 1211. Tracking devices are inserted into both materials. Read/write devices 1205, 1213 may detect tracking devices associated with each material. A tracking device 1207 and the associated non-discrete material that is misrouted will be detected by the read/write devices 1205, 1213 and the transport of each material is examined to determined the cause of the misrouting and correct the problem.

In one embodiment, the tracking system is implemented as a set of hardware devices. In another embodiment, these components are implemented in software (e.g., microcode, assembly language or higher level languages). These software implementations may be stored on a machine-readable medium. A "machine readable" medium includes any medium that can store or transfer information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    inserting a first identification device into a non-discrete good;
    sending an authentication key to the first identification device in the non-discrete good;
    receiving an acknowledgement from the first identification device indicating that a sender of the authentication key has been authenticated by the first identification device;
    sending a data request to the first identification device in response to receiving the acknowledgement;
    receiving a response to the data request from the first identification device;
    determining a characteristic of the non-discrete good from the response from the first identification device by a tracking system, the characteristic including location information describing an actual location of the first identification device as well as a property of the non-discrete good; and
    determining, by a computer with a processor and memory unit, a loss of or addition to the non-discrete good by comparing the actual location for the first identification device and a relative location of the first identification device to any other identification device within the non-discrete good to an expected location for the first identification device and the relative location of the first identification device to the other identification device within the non-discrete good.

2. The method of claim 1, further comprising:
    inserting a second identification device into the non-discrete good, the second identification device to provide additional data regarding the non-discrete good.

3. The method of claim 2, further comprising:
    comparing an actual distance between the first identification device and the second identification device with an expected distance between the first identification device and the second identification device at a time of insertion of the second identification device into the non-discrete good.

4. The method of claim 2, wherein the non-discrete good is any one of a liquid, granular material and gas.

5. The method of claim 2, further comprising:
    storing data about the non-discrete good in the first identification device during transportation of the non-discrete good.

6. The method of claim 2, further comprising:
    determining a rate of movement of the non-discrete good by determining the relative position of the second identification device to the first identification device and an elapsed time.

7. The method of claim 2, further comprising:
    comparing data from the first identification device with data from the second identification device to verify an origin of the non-discrete good.

8. The method of claim 1, wherein the first identification device has characteristics similar to the characteristics of the non-discrete good including any one of density, weight, buoyancy and particle size.

9. The method of claim 1, further comprising:
    identifying an origin of the non-discrete good through the first identification device.

10. The method of claim 1, wherein the first identification device is a radio frequency identification device (RFID).

11. The method of claim 1, further comprising:
    inserting a third identification device into another non-discrete good; and
    detecting an improper mixture of the non-discrete good and another non-discrete good by detection of the first identification device and a third identification device.

12. The method of claim 1, further comprising:
    detecting a loss of the first identification device; and determining a portion of the non-discrete good that is lost based on the detected loss of the first identification device.

13. The method of claim 1, wherein the first identification device indicates a transition between non-discrete goods.

14. A system comprising:
a plurality of identification devices having physical characteristics similar to a non-discrete good;
a set of sensors to communicate with the plurality of identification devices; and
a server communicatively coupled to the set of sensors, the server including an authentication system to send an authentication key to the plurality of identification devices, the server to request data in response to an authentication acknowledgement from the plurality of identification devices, to determine characteristic information about the non-discrete good based on responses to the data request from the plurality of identification devices and to route the non-discrete good through a transportation mechanism.

15. The system of claim 14, wherein the server stores data from the set of sensors, tracks the information about the non-discrete good, and detects transitions between goods in the transportation mechanism.

16. The system of claim 14, wherein the plurality of identification devices are embedded in the transportation mechanism for non-discrete goods.

17. The system of claim 14, wherein the authentication system wakes the identification devices from a dormant state.

18. The system of claim 14, wherein the plurality of identification devices are radio frequency identification devices.

19. The system of claim 14, wherein the non-discrete good is any one of a particulate matter, a gas and a liquid.

20. A non-transitory machine readable medium having instructions stored therein, which when executed by a machine, cause the machine to perform a set of operations comprising:
transmitting a first message to an identification device in a non-discrete good including an authentication key;
receiving a second message from the identification device in response to the first message, the second message including data indicating a characteristic of the non-discrete good the characteristic including location information for the identification device as well as a property of the non-discrete good; and
detecting a mixing, misrouting, gain, or loss of the non-discrete good by tracking the actual location information of the identification device and a relative location information of the identification device to any other identification device within the non-discrete good and comparing the actual location information of the identification device and the relative location information of the identification device to any other identification device within the non-discrete good with expected location information for the identification device and the relative location information of the identification device to the other identification device within the non-discrete good.

21. The non-transitory machine readable medium of claim 20, wherein the first message wakes the identification device from a dormant state.

22. The non-transitory machine readable medium of claim 20, having further instructions stored therein, which when executed by a machine, cause the machine to perform a set of further operations comprising:
storing data from the identification device in a database.

23. The non-transitory machine readable medium of claim 20, having further instructions stored therein, which when executed by a machine, cause the machine to perform a set of further operations comprising:
transmitting a third message to be stored in the identification device.

24. The non-transitory machine readable medium of claim 20, having further instructions stored therein, which when executed by a machine, cause the machine to perform a set of further operations comprising:
tracking movement of the identification device by analyzing a characteristic of the second message.

25. The non-transitory machine readable medium of claim 20, having further instructions stored therein, which when executed by a machine, cause the machine to perform a set of further operations comprising:
accessing a database to update data related to the non-discrete good based on the second message.

* * * * *